J. S. LIGHT.
WRENCH.
APPLICATION FILED JULY 7, 1915.
1,169,043.
Patented Jan. 18, 1916.
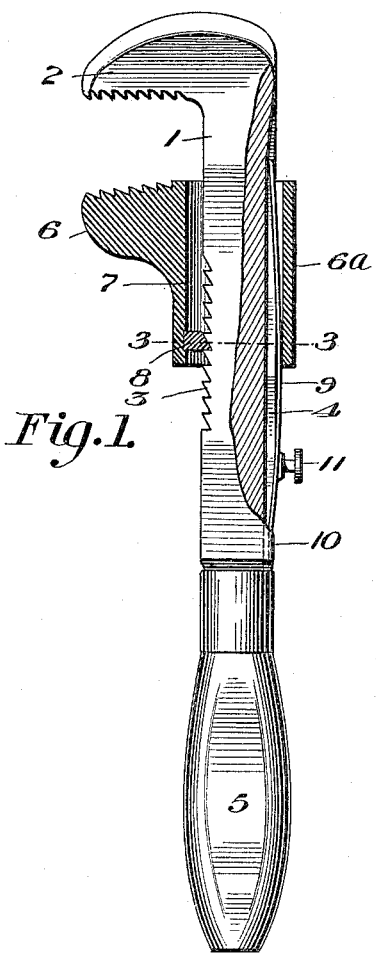
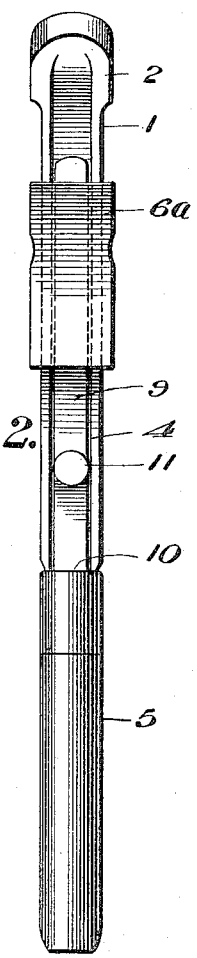
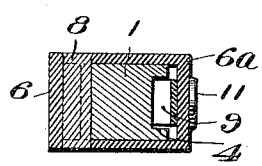

UNITED STATES PATENT OFFICE.

JOHN S. LIGHT, OF ELECTRIC MILLS, MISSISSIPPI, ASSIGNOR OF ONE-HALF TO FREDERICK J. HUGHES, OF ELECTRIC MILLS, MISSISSIPPI.

WRENCH.

1,169,043.     Specification of Letters Patent.     Patented Jan. 18, 1916.

Application filed July 7, 1915. Serial No. 38,407.

*To all whom it may concern:*

Be it known that I, JOHN S. LIGHT, a citizen of the United States, residing at Electric Mills, in the county of Kemper and State of Mississippi, have invented new and useful Improvements in Wrenches, of which the following is a specification.

My present invention pertains to sliding jaw wrenches of the "Stilson" type; and it consists in the simple, compact and readily-adjustable wrench construction hereinafter described and definitely claimed.

In the accompanying drawings which are hereby made a part hereof: Figure 1 is a view, partly in side elevation and partly in section, of my novel wrench. Fig. 2 is a back edge elevation of the same. Fig. 3 is a cross-section taken in the plane indicated by the line 3—3 of Fig. 1 and showing the relative arrangement of the dog in the sliding jaw and the toothed shank.

Similar numerals of reference designate corresponding parts in all of the views of the drawings.

Among other elements my novel wrench comprises a shank 1. The said shank carries a fixed jaw 2 that is preferably toothed at its inner side, and on one edge of the shank are beveled teeth 3 while in the other edge of the shank is a longitudinal groove 4. At its rear end the said shank 1 is fixed in a ferrule at the forward end of a handle 5, which handle is preferably of wood. I would have it understood, however, that the shank 1 when provided with a hand'e may be connected to the handle in any approved manner without involving departure from the scope of my claimed invention.

Movable on the shank is a sliding jaw 6. The said jaw 6 is provided with a sleeve 6ª, the bore 7 of which is of the proportional size shown in Fig. 1 so as to permit of a limited rocking movement of jaw 6 on the shank. Intersecting the bore 7 of jaw 6 and suitably fixed with respect to the jaw is a beveled dog 8 which preferably extends through the width of the sleeve 6ª, as shown in Fig. 3. The said dog 8 is of course, opposed to the teeth 3 of the shank 1, and at the opposite side of shank 1 is arranged a longitudinally-disposed bowed spring 9, the function of which is to yieldingly hold dog 8 in one of the interdental spaces of the shank 1 and thereby retain the jaw 6 against endwise movement on the shank 1 while permitting of a limited rocking movement of said jaw relative to the shank. The said bowed spring is in part arranged in and reinforced by the groove 4 of the shank, and the forward end of the spring is free and capable of slight longitudinal movement in said groove 4 and with respect to the shank, while in the present and preferred embodiment of the invention, the rear end of the spring is carried within the ferrule at the forward end of the handle 5 and is secured by the said ferrule to the shank. It will also be noticed that the spring 9 is in part housed in the sleeve 6ª of the jaw 6 which contributes to the strength and durability of the spring, and that at a point in rear of the jaw 6 the spring is provided with a thumb piece 11.

The arrangement of the forward free end of the spring 9 in the longitudinal groove 4 prevents lateral deflection of the spring and the imposition of any lateral strain on the spring, and this without interfering with the free lengthwise play of the spring which is necessary to easy expansion and contraction thereof, and is also advantageous because it prolongs the usefulness of the spring.

In practice, when it is desired to adjust the jaw 6 and accommodate the wrench to an article of a certain size, it is simply necessary for the operator to press with his thumb on the thumb piece 11 of the spring, whereupon the jaw 6 can be thrown for the diameter desired in the fraction of a second. It will also be noted that while the spring 9 is held under pressure toward the left in Fig. 1, the jaw 6 can be manipulated with the left hand so that it can be moved rearwardly irrespective of the opposition of the dog 8 to the teeth 3. In this way notwithstanding the reliability of the wrench in action, the space between the jaws 2 and 6 can be readily increased as occasion demands.

It will be gathered from the foregoing that the wrench is exceedingly simple and compact, and that it embodies not delicate parts such as are liable to get out of order after a short period of use.

Having described my invention, what I claim and desire to secure by Letters-Patent, is:

The combination in a wrench, of a shank having a fixed jaw extending forwardly therefrom and also having beveled teeth on its forward edge and a longitudinal groove in its rear edge, a sliding and rocking jaw having a sleeve relatively larger than and receiving the shank, a dog carried by the jaw in said sleeve thereof and opposed to the forward toothed edge of the shank, and a longitudinally-disposed bowed spring fixedly connected at its inner end with the shank and arranged in the longitudinal groove thereof and housed in part in the sleeve of the sliding and rocking jaw, and having its outer portion disposed and movable longitudinally in said groove of the shank.

In testimony whereof I have hereunto set my hand in presence of two subscribing witnesses.

JOHN S. LIGHT.

Witnesses:
J. G. NORMAN,
E. A. TEMPLE.

Copies of this patent may be obtained for five cents each, by addressing the "Commissioner of Patents, Washington, D. C."